Jan. 1, 1929. Re. 17,185

T. E. MURRAY

HEAT EXCHANGER

Original Filed June 13, 1923 2 Sheets-Sheet 1

Inventor
Thomas E. Murray

By Attorney
D. Anthony Usina

Jan. 1, 1929. Re. 17,185

T. E. MURRAY

HEAT EXCHANGER

Original Filed June 13, 1923 2 Sheets-Sheet 2

Thomas E. Murray Inventor

By Attorney
D. Anthony Usina

Reissued Jan. 1, 1929. Re. 17,185

UNITED STATES PATENT OFFICE.

THOMAS E. MURRAY, OF BROOKLYN, NEW YORK.

HEAT EXCHANGER.

Original No. 1,548,158, dated August 4, 1925, Serial No. 645,017, filed June 13, 1923. Application for reissue filed July 28, 1927. Serial No. 209,151.

This invention relates to means whereby the hot gases passing through one flue can give up their heat to a conductor which can be moved into the path of a stream of air passing through an adjacent flue.

An embodiment of the invention is illustrated in the accompanying drawings in which Fig. 1 is a plan view showing an air conduit in horizontal section and waste gas conduit surrounding the same;

Figure 1:
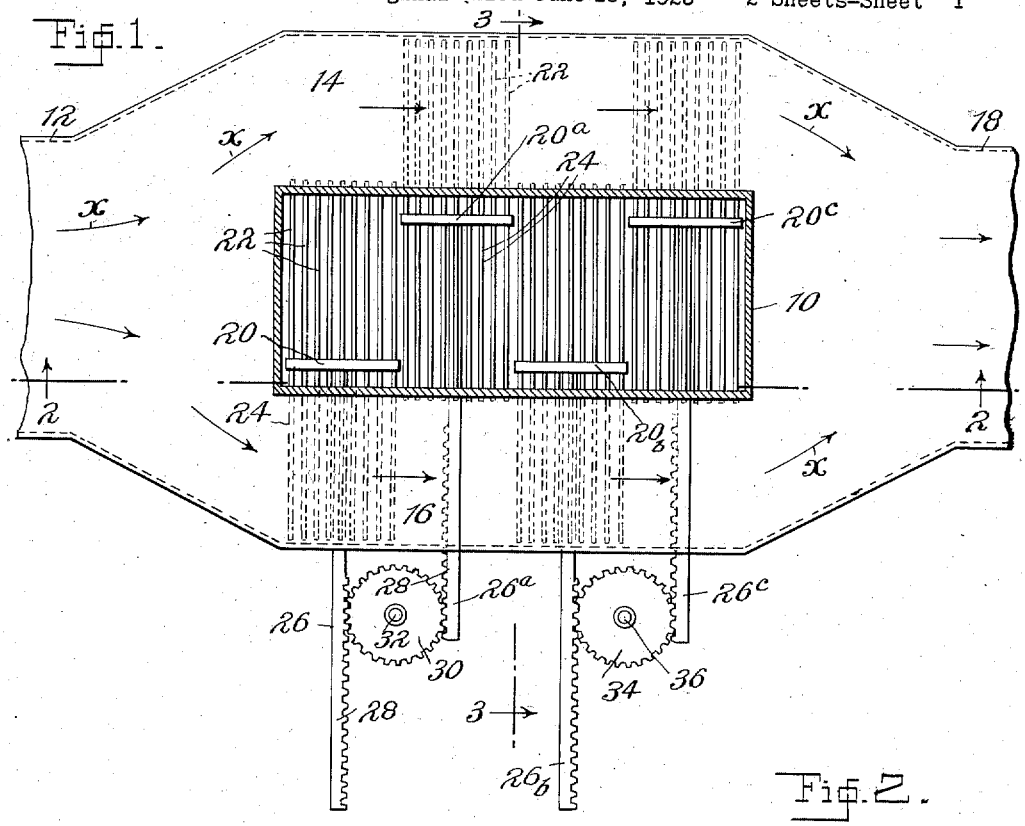
Figure 2:
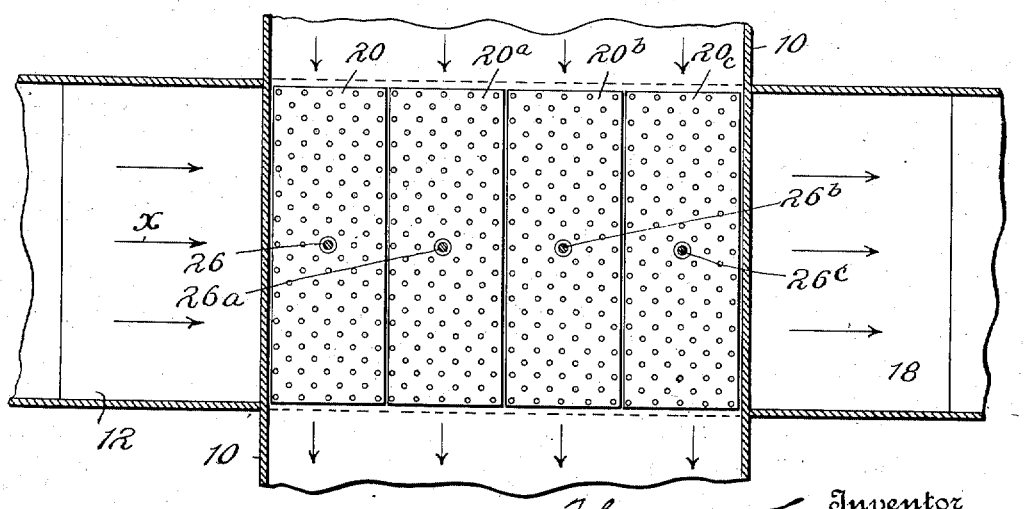
Fig. 2 is a longitudinal section on line 2—2 of Fig. 1.
Figure 3:
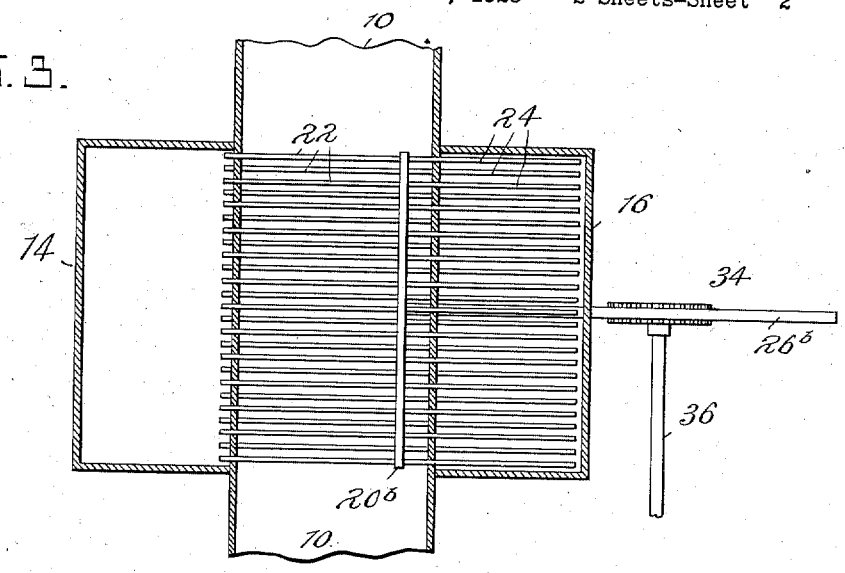
Fig. 3 is a transverse section on line 3—3 of Fig. 1.

Referring first to Fig. 1, 10 is a vertical conduit through which air to be heated is passed. A waste gas conduit surrounds the air conduit and means are provided whereby the hot gases flowing through said waste gas conduit can give up their heat to conductors which are adapted to be subsequently moved into the path of the air flowing in the conduit 10 so as to heat such air.

The inlet end 12 of the waste gas conduit connects with branch portions 14 and 16 located on opposite sides of the air conduit. The waste gases pass, as indicated by the arrows $x$, from the inlet end of the conduit 12 through the branches 14 and 16 to the outlet end 18 of the conduit.

Located within the conduit 10 are a number of plates 20, $20^a$, $20^b$, $20^c$, each having secured thereto a multiplicity of outwardly extending rods whose portions 22 are adapted at certain times to be moved into the branch 14 and withdrawn to the interior of the conduit 10, and whose portions 24 are similarly arranged to be alternately moved from the interior of the conduit 10 to the interior of the branch 16. The rods are secured to the plates 20, $20^a$, $20^b$, $20^c$ and fit loosely in suitable apertures formed in the side walls of the conduit 10 so that they can be readily reciprocated.

The plates 20 and $20^a$ have secured thereto outwardly extending rack bars 26 and $26^a$ each formed with teeth 28 for engagement with the teeth on a drive gear 30 carried on a shaft 32.

The plates $20^b$ and $20^c$ are similarly provided with rack bars $26^b$ and $26^c$ arranged to be reciprocated by a gear 34 carried by a shaft 36.

The shafts 32 and 36 are driven by any suitable reversing mechanism, such as a reversing electric motor, so as to turn the gears first in one direction and then in the opposite direction. The result of this movement will be, for example, that the portions 22 of the rod carried by plate 20 will be moved from the interior of the conduit 10 to the interior of the branch 14, and the portions 22 of the rod carried by the plate $20^a$ will be withdrawn from the branch 14 to the interior of the conduit 10. When the portions 22 of the rods are in the path of the hot gases, the opposite portions 24 are in the path of the air passing through the conduit 10.

It is apparent that the portions of the rods within the branches 14 and 16 are heated by the gases flowing therethrough and that when the plates 20, $20^a$, $20^b$ and $20^c$ are moved the rods are correspondingly moved so as to give up their heat to the air flowing in the conduit 10.

Figure 4:
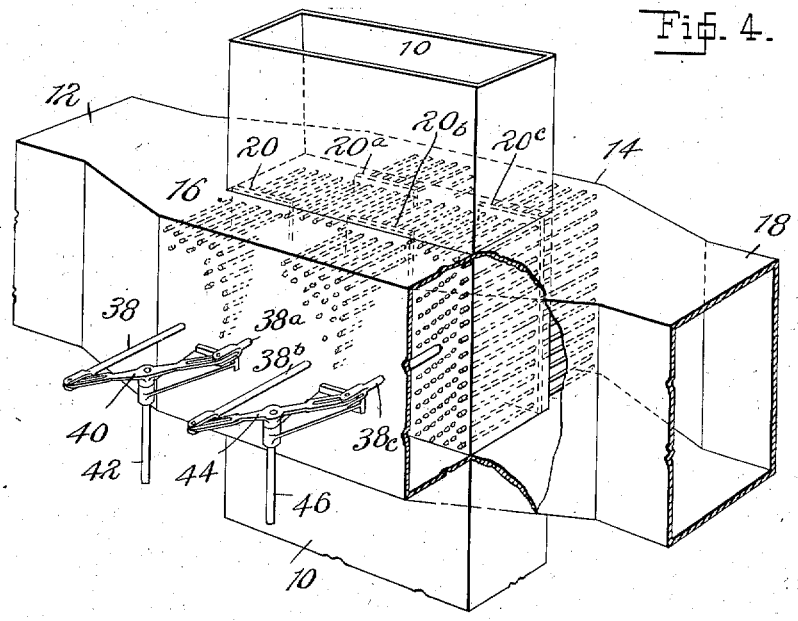
Fig. 4 is a perspective view with parts broken away showing a modified construction.

In Fig. 4, I have shown a slightly modified arrangement where in place of the racks 26, $26^a$, $26^b$, $26^c$, I have provided rods 38, $38^a$, $38^b$, $38^c$ for reciprocating the plates 20, $20^a$, $20^b$, $20^c$. The rods 38 and $38^a$ are connected by a pin and slot connection with a rocking lever 40 carried by a shaft 42. Similarly rods $38^b$ and $38^c$ are connected to a rocking lever 44 carried by a shaft 46. The shafts 42 and 46 will be rocked back and forth by any suitable mechanism so as to alternately move the rods into the stream of hot gases and into the stream of air so as to heat the latter.

In the drawings, I have shown a multiplicity of rods carried by the plates $20^a$ to $20^c$, the rods being arranged in banks, one bank staggered with respect to the other. The rods may be otherwise arranged and in some cases in place of the solid rods shown, I may substitute plates, hollow rods or conducting members of various other shapes.

Each group of rods attached to one of the plates 20, $20^a$, $20^b$, $20^c$ constitutes a device which always lies partly in the gas conduit and partly in the air conduit (considering the two branches of the latter as parts of a single conduit). Similarly the several groups and plates taken together constitute a device which always lies partly in one conduit and partly in the other. Thus there is a constant absorption and a constant dispersion of the heat, which makes for efficiency of the complete apparatus by a practically continuous transfer of the heat. The same end is served by the fact that at all times there is practically the same extent of exposure of the conducting device in each of the two conduits.

While I have described with great particularity of detail the embodiments of the invention herein shown, it is not to be construed that I am limited thereto, as changes in arrangement and substitution of equivalents may be made by those skilled in the art without departing from the invention as defined in the appended claims.

What I claim is:

1. A heat exchanger including a pair of juxtaposed conduits and a plurality of heat conducting members extending laterally across one of said conduits and arranged to be reciprocated to extend across the other.

2. A heat exchanger including a conduit for the passage of air, a casing surrounding said conduit for the passage of hot gases, a plurality of members arranged so that they can be alternately moved into the conduit and into the casing and vice-versa.

3. A heat exchanger including a pair of juxtaposed conduits, a plurality of heat conducting members and means for reciprocating the latter so that they alternately occupy a position in each conduit.

4. A heat exchanger including a pair of juxtaposed conduits, a heat conducting device which always lies partly in one and partly in the other conduit and which is reciprocable to bring the different parts of it alternately from one conduit to the other.

5. A heat exchanger including a pair of juxtaposed conduits and heat conducting devices comprising each a plurality of heat-conducting elements each of which lies at all times partly in one and partly in the other conduit, said devices being movable with relation to each other to bring the different parts of each element from one conduit to the other.

6. A heat exchanger including a pair of juxtaposed conduits and a heat conducting device substantially the whole heat conducting material of said device consisting of a group of pieces each of which lies at all times partly in one and partly in the other conduit and which are movable to bring their different parts first into one conduit and then into the other.

In witness whereof, I have hereunto signed my name.

THOMAS E. MURRAY.